Sept. 7, 1926.

P. W. JENSEN

SNAP HOOK

Filed April 26, 1926

1,598,684

Inventor

P. W. Jensen.

By Lacey & Lacey, Attorneys.

Patented Sept. 7, 1926.

1,598,684

UNITED STATES PATENT OFFICE.

PETER W. JENSEN, OF PRINCETON, MINNESOTA.

SNAP HOOK.

Application filed April 26, 1926. Serial No. 104,743.

This invention relates to snap hooks and one object of the invention is to provide a snap hook with a shackle which may freely turn about its shank but may not readily become disengaged therefrom.

Another object of the invention is to provide the snap hook with a guiding bushing for its keeper which may also serve to prevent accidental releasing of the shackle.

Another object of the invention is to provide a snap hook which may be readily taken apart when it is necessary to repair or replace broken elements forming the hook.

This invention is illustrated in the accompanying drawing, wherein

Figure 1:
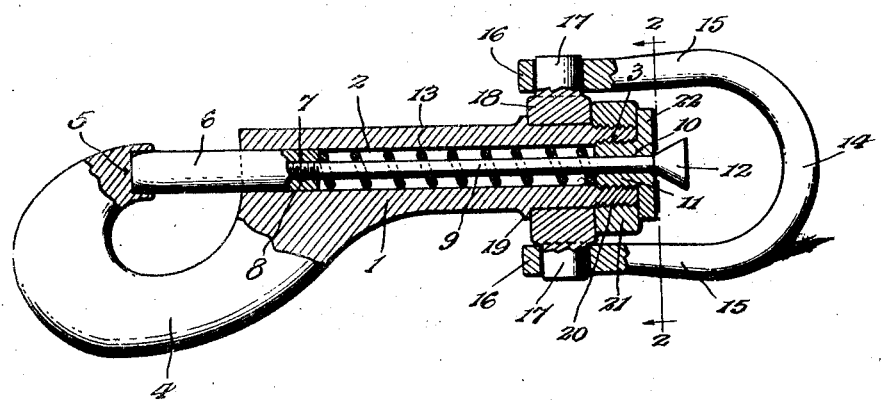
Figure 1 is a view showing the improved hook principally in longitudinal section.
Figure 2:
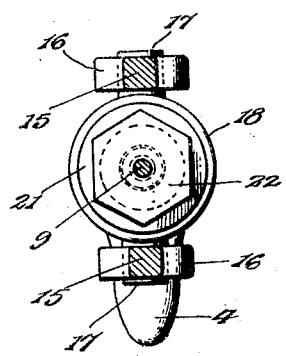
Fig. 2 is a transverse sectional view taken on the line 2—2 of Fig. 1.

The snap hook forming the subject-matter of this invention is provided with a shank 1 formed of steel or other strong metal and having a longitudinally extending passage 2 which opens through the forward and rear ends of the shank and has its rear end portion threaded, as indicated in Fig. 1 by the numeral 3. A bill 4 extends transversely from the forward end portion of the shank and projects beyond its forward end. The bill is curved, as shown in Fig. 1, and has its free end facing the forward end of the shank and formed with a socket 5 alined with the passage 2. The socket 5 is adapted to receive the forward end of a latch plunger 6 which is slidable longitudinally in the passage 2 and has its inner end portion provided with a threaded socket 7 to receive the threaded forward end 8 of an actuating stem 9. The stem 9 extends axially of the passage 2 and projects outwardly through a bore 10 formed in a bushing 11 which is screwed into the threaded rear end portion of the passage. At its outer end the stem 9 is formed into a head 12 so that the latch stem may be readily grasped when it is desired to retract the plunger 6 against the action of a spring 13 disposed in the passage between the inner ends of the plunger and bushing.

The shackle 14 which is intended for engagement by a halter chain or similar device is substantially U-shaped and has its arms 15 straddling the shank and provided at their forward ends with eyes 16 which fit loosely upon arms or trunnions 17 projecting from opposite sides of a collar 18. The collar 18 fits loosely upon the shank 1 between the annular shoulder or abutment 19 and the externally threaded rear end portion 20 of the shank and is held upon the shank by a nut 21 screwed upon the threaded rear end portion of the shank. The collar 16 and nut 21 are applied to the shank before the bushing 11 is screwed into the threaded rear end portion of the passage 2 and since the bushing is provided at its outer end with an enlarged turning head 22 of sufficient diameter to overlap the rear end of the nut it will serve as an annular abutment shoulder to retain the nut upon the shank and prevent it from accidentally working loose. It will be readily seen that if the nut became detached from the shank the collar would be permitted to slip rearwardly off the shank and the snap hook would become detached from the chain engaged with the shackle. When it is necessary to repair or replace any of the elements from which the snap hook is formed, the bushing can be easily unscrewed and the shackle will be released and the latch plunger together with its stem and spring may be removed from the shank. Necessary repairs or replacements can be made and the hook reassembled.

Having thus described the invention, I claim:

1. A snap hook comprising a shank formed with a longitudinally extending passage opening through its ends, a bill extending from said shank and having its free end spaced from the forward end thereof, an abutment spaced from the rear end of said shank, a nut screwed upon the rear end portion of said shank, a collar loose upon said shank between said nut and abutment and held thereon by the nut, a closure for the rear end of said passage removably secured therein and having a portion extended radially into overlapping relation to the rear end of said nut to retain the nut upon the shank, and a latch plunger slidable in said passage and yieldably held projected from the forward end thereof into engagement with the free end of said bill.

2. A snap hook comprising a shank formed with a longitudinally extending passage opening through its ends, a bill extending forwardly from said shank and having its free end spaced from the forward end thereof, an abutment carried by said shank in spaced relation to its rear end, a nut screwed upon said shank in spaced relation to said abutment, a collar loose upon said shank between said abutment and nut and held thereon by the nut, a shackle carried by said collar, a bushing removably secured in the rear portion of said passage and having a radial extension overlapping the rear end of said nut to prevent removal of the nut from said shank, a latch plunger slidable in said passage and having a stem extending outwardly through said bushing, and a spring between said bushing and plunger yieldably holding the plunger projected into engagement with the free end of said bill.

3. A snap hook comprising a shank formed with a longitudinally extending passage, a bill extending forwardly from said shank and having its free end facing the forward end of the shank in spaced relation thereto, a nut screwed upon the rear end portion of said shank, an abutment spaced forwardly from said nut, a collar loose upon said shank between said abutment and nut, a shackle carried by said collar, a bushing screwed into the rear end portion of said passage and formed with a longitudinally extending bore, said bushing having a head projecting radially across the rear end of said shank and adapted to engage said nut and prevent removal thereof, a plunger slidable in said passage, a stem for said plunger extending through said passage and outwardly through the bore of said bushing, and a spring in said passage confined between said bushing and plunger and yieldably holding the plunger projected into engagement with the free end of said bill.

4. A snap hook comprising a shank, a bill carried by said shank and terminating in spaced relation to its forward end, the shank being formed with a longitudinally extending passage opening through its ends, the rear end portion of said shank being internally and externally threaded and provided with an abutment in spaced relation to its external threads, a collar fitted loosely upon said shank between said abutment and the threaded end portion of the shank and rotatable thereon, trunnions extending from said collar, a shackle pivoted upon said trunnions, a securing nut screwed upon the rear end portion of said shank, a bushing screwed into the rear end portion of said shank and having a head extending radially and adapted to engage said nut and prevent unscrewing of the nut from the shank, said bushing having a bore communicating with the passage in said shank, a plunger slidable in said passage, a rod extending from said plunger through the passage and projecting outwardly through the bore of said bushing, and a spring coiled about said rod between said bushing and plunger and yieldably holding the plunger projected outwardly from the forward end of the shank into engagement with said bill.

In testimony whereof I affix my signature.

PETER W. JENSEN. [L. S.]